US012777218B2

(12) United States Patent
Aher et al.

(10) Patent No.: US 12,777,218 B2
(45) Date of Patent: Oct. 27, 2026

(54) SYSTEMS AND METHODS FOR SIMULTANEOUS CONTENT PRESENTATION

(71) Applicant: Adeia Guides Inc., San Jose, CA (US)

(72) Inventors: Ankur Anil Aher, Kalyan (IN); Susanto Sen, Bangalore (IN); Gyanveer Singh, Bangalore (IN)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 18/962,840

(22) Filed: Nov. 27, 2024

(65) Prior Publication Data

US 2025/0097516 A1 Mar. 20, 2025

Related U.S. Application Data

(63) Continuation of application No. 16/937,478, filed on Jul. 23, 2020, now Pat. No. 12,192,567.

(51) Int. Cl.

*H04N 21/431* (2011.01)
*H04N 21/485* (2011.01)
*H04N 21/488* (2011.01)

(52) U.S. Cl.

CPC ..... *H04N 21/4316* (2013.01); *H04N 21/4314* (2013.01); *H04N 21/4858* (2013.01); *H04N 21/4886* (2013.01)

(58) Field of Classification Search

CPC ........... H04N 21/4316; H04N 21/4314; H04N 21/4858; H04N 21/4886; H04N 21/4394; H04N 21/44008; H04N 21/440236; H04N 21/4852; H04N 21/43072
USPC .......................................................... 348/565
See application file for complete search history.

(56) References Cited

U.S. PATENT DOCUMENTS

| | | | | |
|---|---|---|---|---|
| 4,693,804 A | | 9/1987 | Serwer | |
| 5,327,176 A | * | 7/1994 | Forler | H04N 21/4884 348/564 |
| 5,408,273 A | * | 4/1995 | Okamura | H04N 21/47 348/E5.122 |
| 6,239,794 B1 | | 5/2001 | Yuen et al. | |
| 6,564,378 B1 | | 5/2003 | Satterfield et al. | |
| 7,996,864 B2 | * | 8/2011 | Yuen | H04N 5/775 348/588 |

(Continued)

FOREIGN PATENT DOCUMENTS

| | | |
|---|---|---|
| EP | 2648087 A2 | 10/2013 |
| WO | 2017196844 A1 | 11/2017 |

OTHER PUBLICATIONS

International Search Report and Written Opinion in PCT/US2020/066715 dated Dec. 22, 2020.

*Primary Examiner* — John W Miller
*Assistant Examiner* — Omer Khalid
(74) *Attorney, Agent, or Firm* — HG LAW LLP

(57) ABSTRACT

A computer implemented method that includes receiving a request to present a first content item and, in response, a second content item is presented using a first presentation type. A second request is received to modify the presentation size of the second content item and, in response, the first content item is presented simultaneously with the second content item. A determination is made that the modified size of the second content item crosses a threshold and, in response, the second content item is presented using a second presentation type.

20 Claims, 10 Drawing Sheets

(56) References Cited

U.S. PATENT DOCUMENTS

| | | | |
|---|---|---|---|
| 9,210,360 | B2 * | 12/2015 | Mountain .......... H04N 21/4394 |
| 2014/0095328 | A1 | 4/2014 | Forouzandeh et al. |
| 2017/0095328 | A1 | 4/2017 | Cooper et al. |
| 2017/0147095 | A1 | 5/2017 | Nicholls et al. |
| 2018/0014066 | A1 | 1/2018 | Berman et al. |
| 2019/0306561 | A1 | 10/2019 | Xu et al. |
| 2020/0125600 | A1 | 4/2020 | Jo |
| 2020/0382551 | A1 | 12/2020 | Harris et al. |
| 2021/0274250 | A1 | 9/2021 | Chundi et al. |
| 2022/0030299 | A1 | 1/2022 | Aher et al. |

* cited by examiner

SYSTEMS AND METHODS FOR SIMULTANEOUS CONTENT PRESENTATION

CROSS-REFERENCE TO RELATED APPLICATION

This application is a continuation of U.S. patent application Ser. No. 16/937,478, filed Jul. 23, 2020, the disclosure of which is hereby incorporated by reference herein in its entirety.

BACKGROUND

The present disclosure relates to media play systems and methods and, more particularly, to systems and methods related to simultaneous media content presentations.

SUMMARY

Many media platforms permit the presentation of different content items together, either by interspersing the content or presenting the content simultaneously. For example, advertisements may be presented during or at the beginning of presenting a streaming content including a movie or television program. Some advertising content interfaces include a feature that permits exiting the advertising content immediately or skipping it after a short period of time. Sometimes a link (e.g., to a third party website) connected with an advertiser is provided outside the streaming content display. However, such links are frequently not easy to locate or displayed in a manner that does not encourage attention to it. Many users instinctively exit an advertisement or wait for a skip option to appear and thus consume very little if any of the advertising content. As a result, the presenters of the content may not obtain the desired consumption and attention because of an inadequate presentation interface.

In some media platforms, a simultaneous display of different content is presented to a viewer in order to allow them to focus attention to different content items more readily. For example, some picture-in-picture (PIP) technologies permit consumers to watch one content (e.g., a streaming movie) while simultaneously watching a second content (e.g., a sporting competition) within a smaller overlaid display window. However, while a second content item is presented simultaneously with a first, it may be difficult to consume one or both content items to a satisfactory level without focusing significant attention away from the other content item(s). For example, it may be difficult to absorb or consume the activity occurring in a competition content (e.g., a scoring drive) without interrupting another streaming content (e.g., a movie). Thus, presentation interfaces are needed for presenting different content items together in order to improve the ability to present and consume them simultaneously.

In the presentation of some content items, presenting its audio content can be important the presentation. For example, speech presented in some advertisements (e.g., a spoken description) may be important to conferring the intended message of the content. While a movie or other streaming content is presented with audio, it may be difficult to present the audio content of an advertising content item without interrupting the streaming/movie content. Improved technologies are thus desired for presenting the audio-based portions of different content items simultaneously.

In some embodiments of the present disclosure, content items are presented simultaneously through an interface in which a content item is presented using a particular presentation type (e.g., streaming video, text banner, stationary image) while the interface receives requests for modifying the display size, position, or volume of the content item. A process determines whether the modified size, position, or volume crosses a particular size threshold and, in response to determining that the threshold size is crossed, the presentation type of the content item is modified (e.g., from streaming video to stationary image). In some embodiments, a process determines whether the presentation of a second content item interferes by a predetermined amount with a portion of a first content item presentation. Upon determining such an interference, the presentation type of the second content item may be modified so as to reduce the interference. In some embodiments, the modifications of particular content items are analyzed and, based on the analysis, a preference for presenting and emphasizing particular presentation types for particular content items is determined. Based on determining the preference, presentation types are used for presenting particular presentation items. That way, the interface permits a consumer to avoid an undesired interruption of one content item while a certain degree of presentation of the other content item is maintained.

In some embodiments of the present disclosure, audio content items are presented simultaneously through an interface in which a content item is presented using a particular presentation type (e.g., streaming video/audio) while the interface receives requests for modifying the volume of the content item. A process determines whether the modified volume crosses a particular volume threshold and, in response to determining that the threshold volume is crossed, the presentation type of the content item is modified (e.g., from streaming video to scrolling text with a reduced or no audio volume). That way, the interface permits a consumer to avoid an undesired interruption of one content item while a certain degree of presentation of the other content item is maintained.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

In an aspect of the disclosure, systems and methods implement an interface for presenting content items simultaneously using different presentation types in response to modifications of the size or volume of a presentation. In some embodiments, the presentation type is modified based on crossing particular thresholds of size or volume. Presentation types may include, for example, video, image, text, and/or closed captioning presentation types.

Figure 1:
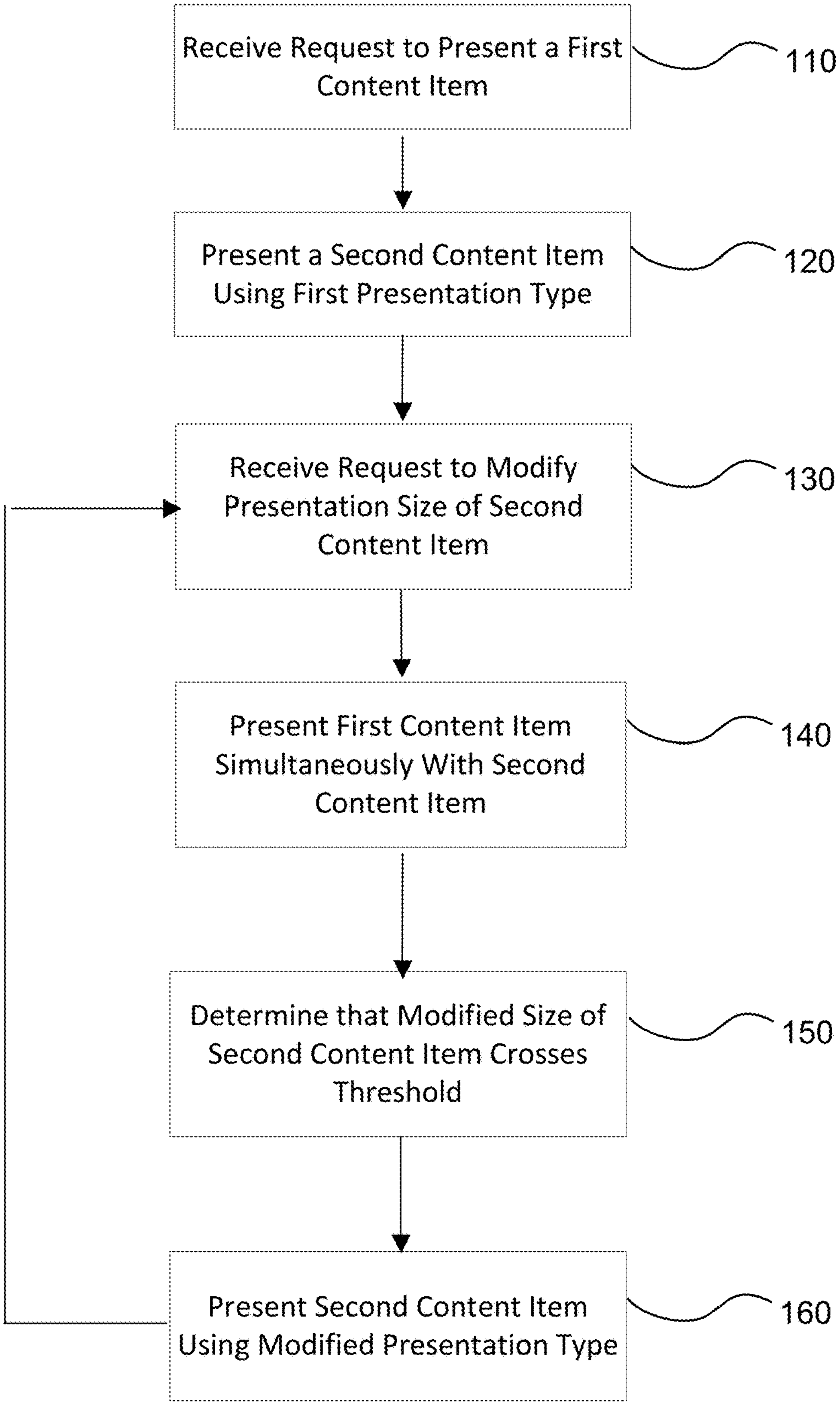
FIG. 1 is an illustrative flowchart of a process for simultaneous presentation of content using multiple presentation types according to some embodiments of the disclosure.

FIG. 1 is an illustrative flowchart of a process for simultaneous presentation of content using multiple presentation types according to some embodiments of the disclosure. At block 110, a request is received to present a content item from a device display interface (e.g., a device display interface 410 shown in FIG. 4A). The content may be a streaming content such as a movie or broadcast television program, for example. At block 120, in response to receiving the request to present the first content item, a second content item is presented (e.g., an advertisement content item 430 presented in display interface 400 of FIG. 4B).

The second content item is presented using a first content presentation type. The presentation type may include a video, image, text, or other presentation type. For example, the presentation may include a video content type with actors displayed shown using and voicing descriptions of an advertised product. The presentation may alternatively or in addition include a static image presentation type showing an image of a product.

At block 130, a request is received to modify the presentation size of the second content item. The request may be in the form of user input (e.g., utilizing a mouse or touchscreen) in association with a computer interface. The input may include selecting and "grabbing" the edge of the display window and moving it closer to another edge of the display window. An input/request may include a request to "minimize" or close the size of a display window. Other forms of input/requests for modifying a presentation size may be received such as further described herein.

Figure 5A:
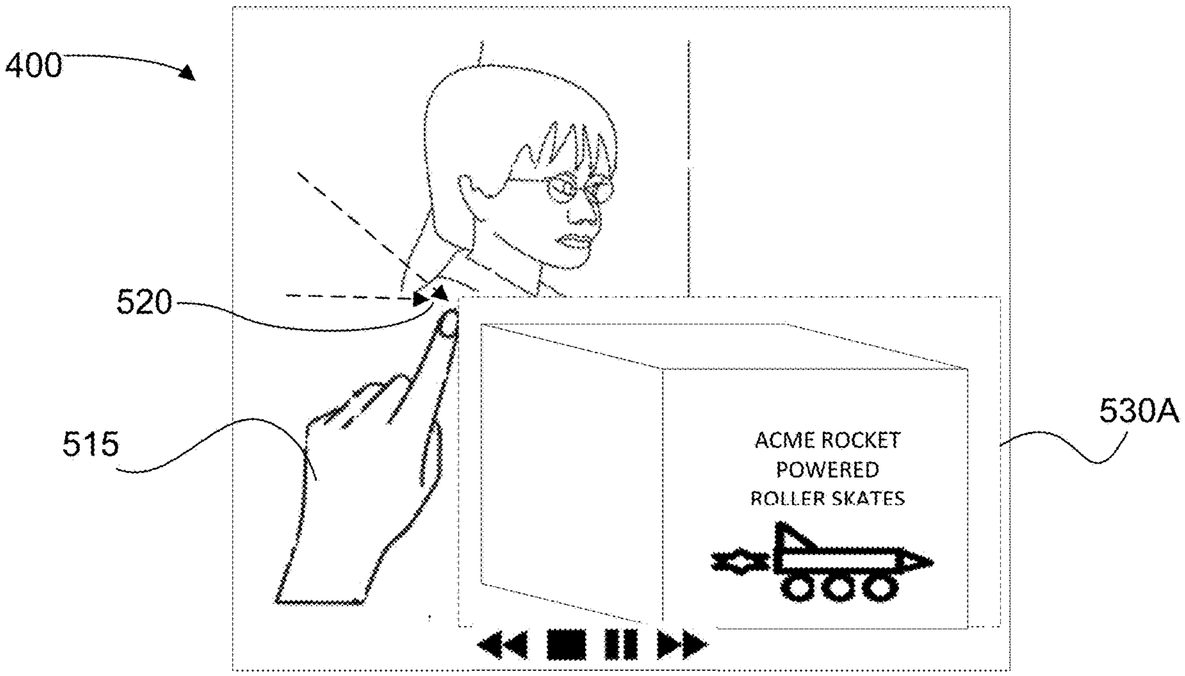
FIG. 5A is an illustrative diagram of a graphical computer interface presenting content items simultaneously according to some embodiments of the disclosure.

At block 140, the first content item (e.g., a streaming movie) and second content item (e.g., a streaming advertisement) are presented simultaneously/concurrently. The content items may be presented simultaneously from a common display screen such as by overlapping the content items (e.g., as shown in FIG. 5A) or by presenting them from separate display windows at the same time. The interface through which the content items are presented permits the second content item to be further resized, such as described above, while the content items are simultaneously presented. This permits a user to, for example, size/position the second content item into a preferred area of a display screen so as not to interfere with the presentation of the first content item to an undesired degree.

At block 150, a determination is made that modifications to the presentation size of the second content item causes its size to cross a particular threshold. For example, a threshold may reflect when a display window's presentation size has reached a fraction (e.g., half) of the size of a maximum-sized display window. As a presentation size is reduced/increased in response to modification requests/input such as described above, the presentation's size may be determined after each modification.

At block 160, in response to determining that the presentation size of the second content item has crossed a threshold at block 150, the second content item is presented using a second presentation type. The second presentation type may reflect an optimized presentation for the modified (e.g., reduced) size of the second content item's presentation. For example, when the first presentation type of the second content item is a video content type, and the presentation size falls below a threshold, the second presentation type may be modified to an image or text content type. As opposed to a streaming video of actors using and discussing an advertised product, the presentation of the second content item may include a static image of the same product and/or text reflecting the product brand name. While presenting the second content item using a second presentation type, the process may continue to receive requests at block 130 for modifying its presentation size.

Multiple thresholds may be used for modifying a content item presentation between multiple presentation types. The thresholds may be configurable and/or obtained in association with the receipt of particular content items and particular presentation types of the content items. That way, different presentation types of content may be tailored or optimized for different ranges of presentation sizes.

In some embodiments, different presentation types for a content item are generated dynamically by a device such as a device configured for transmitting or presenting the content item. In some embodiments, presentations of different types are generated by analyzing obtained contents of the content item. For example, a streaming video content item for advertising a product may be analyzed for identification and extraction of still images of the product and/or audio descriptions of the product. The extracted content may be used to generate separately presentable content of different content types (e.g., an image content type, a text content type based on a transcription of the extracted audio). The separately presentable content of different content types is then used to present a content item in response to crossing particular presentation size thresholds such as described herein.

Figure 2:
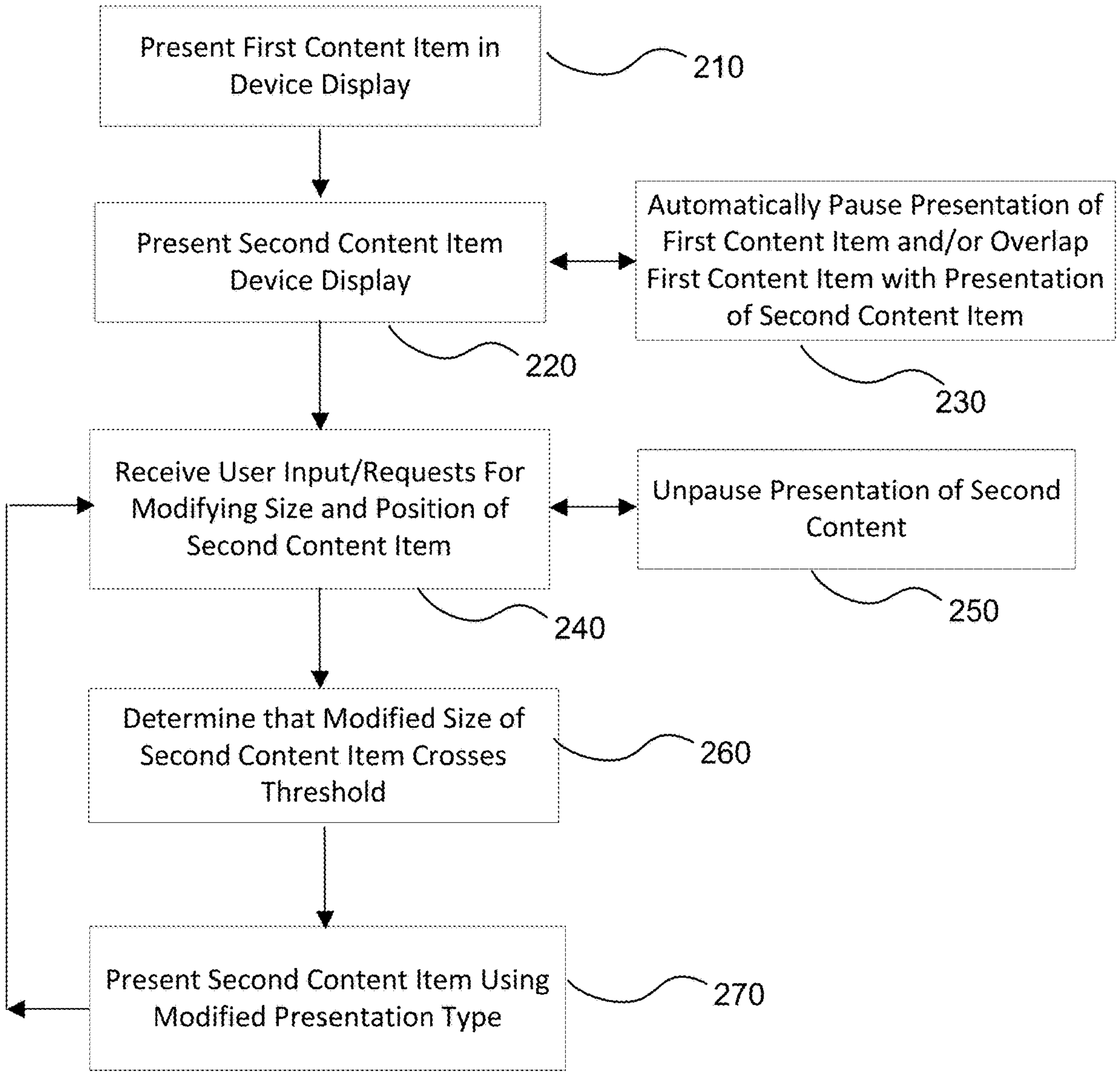
FIG. 2 is an illustrative flowchart of a process for simultaneous presentation of content using multiple presentation types according to some embodiments of the disclosure.

FIG. 2 is an illustrative flowchart of a process for simultaneous presentation of content using multiple presentation types according to some embodiments of the disclosure. At block 210, a first content item (e.g., streaming video) is presented. At block 220, a second content item (e.g., an advertisement) is presented. The second content item may be selected and presented in response to the presentation of the first content item. For example, a particular advertisement may be selected based on a particular streaming video that is presented and/or, for example, based on an account associated with the device or application through which the streaming video is presented.

In some embodiments, the first content item is automatically paused (e.g., a playing of a streaming video is suspended) at block 230 after the second content item is presented. The first content item may not be displayed/presented initially upon presentation of the second content item. In some embodiments, the second content item is presented/displayed so that it overlaps the first content item either in a paused state or while it continues to be presented.

At block 240, a request is received for modifying the presentation size of the second content item. The request may be in the form of user input (e.g., utilizing a mouse or touchscreen) in association with a computer interface such as illustrated in FIGS. 5 and 6. In some embodiments and in response to receiving the request, the first content is unpaused at block 250. For example, after the first content item is automatically paused at block 230 in connection with presenting the second content item, the first content item may be automatically unpaused in response to a modification (e.g., a minimization) of the second content item's presentation size.

At block 260, the process determines the modified size of the second content item's presentation following the request at block 240. The determined presentation size is compared to a threshold and the process determines when the presentation size of the second content item has crossed the threshold (e.g., from above the threshold to being below the threshold). At block 270, in response to determining that the threshold has been crossed, the second content item is presented using a modified presentation type. Such as further described herein, the modified presentation type is optimized for presentation using the modified (e.g., reduced) presentation size. While the presentation of the second item proceeds, further requests for modifying its presentation size may be received at block 270.

Figure 3A:
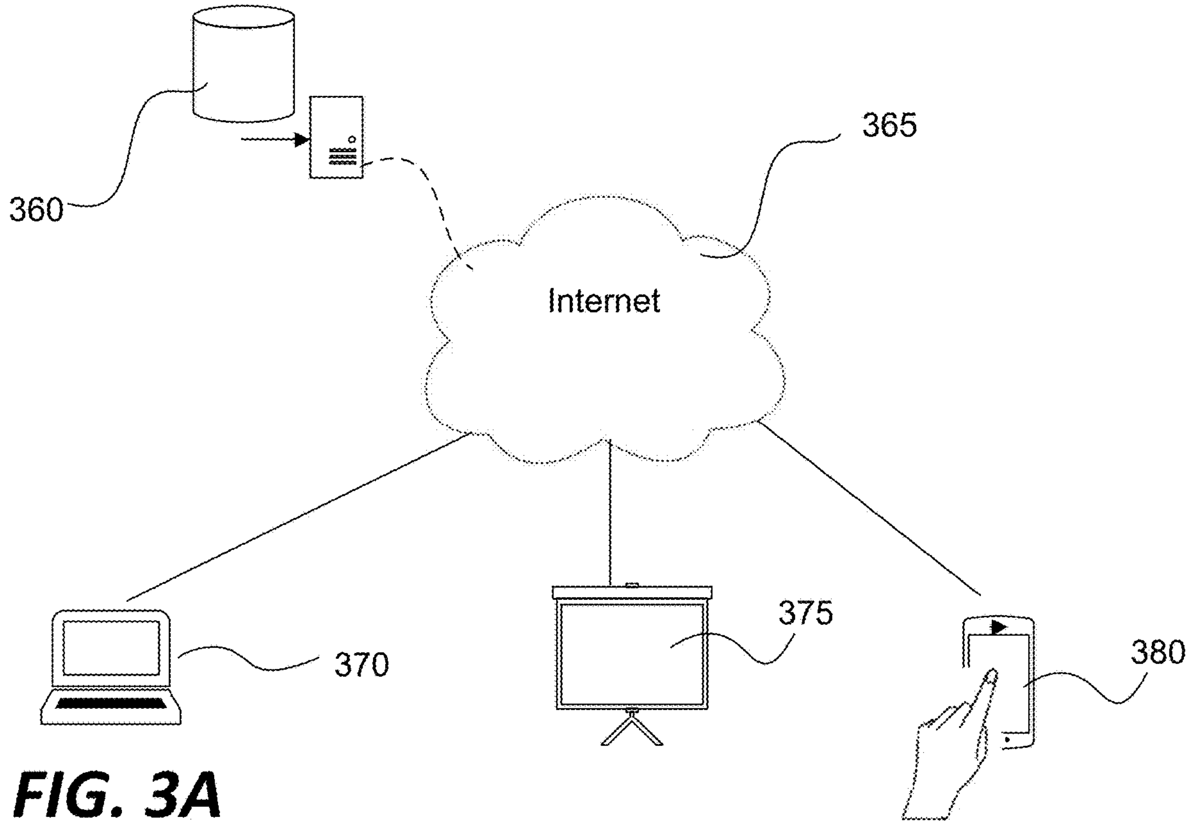
FIG. 3A is an illustrative topology of devices programmed and configured for simultaneous presentation of content according to some embodiments of the disclosure.

FIG. 3A is an illustrative topology of devices programmed and configured for simultaneous presentation of content according to some embodiments of the disclosure. A network server 360 is configured to permit user devices 370 and 380 the ability to download and present content such as with a content presentation interface (e.g., the interfaces of FIGS. 4-5) described further herein. For example, a program (e.g., an app or web interface) installed on user devices 370 and 380 may be programmed to present content including, for example, streaming and/or downloaded content of different presentation types (e.g., video, images, text, audio). Content for multiple presentation types for a particular content may be accessible and transmitted through server 360 to devices 370 and 380.

Through streaming or downloading content from server 350, devices 370 or 380 may present the content via respective display/presentation interfaces. These interfaces may be configured to receive the requests/user input for presenting the content items described in reference to the processes and interfaces of FIGS. 1-2 and 4-7. Further, programming for implementing these processes and interfaces may be stored and/or executed, in whole or in part, on devices 370 and 380 and/or server 350.

Figure 3B:
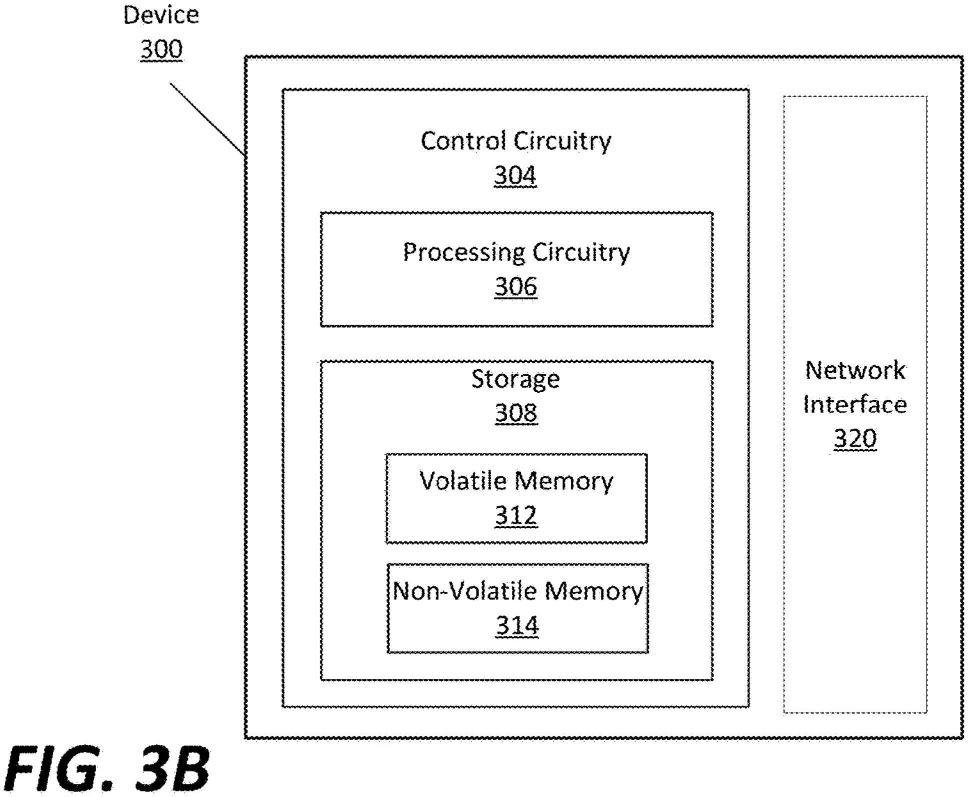
FIG. 3B shows an illustrative block diagram of a device in a content presentation system according to some embodiments of the disclosure.

FIG. 3B shows an illustrative block diagram of a device in a content presentation system according to some embodiments of the disclosure. A system for presenting content may include, for example, servers, data storage devices, communication devices, display devices, and/or other computer devices such as shown in FIG. 3A. Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer.

In some embodiments, processing circuitry 306 may be distributed across multiple separate processors or processing units, for example, multiple of the same type of processing units (e.g., two Intel Core i7 processors) or multiple different processors (e.g., an Intel Core i5 processor and an Intel Core i7 processor). A network interface 320 may be used to communicate with other devices in a network system (e.g., devices 350, 370, and 380 as shown in FIG. 3A) or with other devices connected to internet 365.

In some embodiments, control circuitry 304 executes instructions for simultaneous presentation of content and/or other processing functions stored in memory (i.e., storage 308). The instructions may be stored in either a non-volatile memory 314 and/or a volatile memory 312 and loaded into processing circuitry 306 at the time of execution. A system for presenting content items simultaneously (e.g., the systems described in reference to FIG. 3A) may be a standalone application implemented on a user device (e.g., device 370 and/or 380) and/or a server (e.g., device 350) or distributed across multiple devices in accordance with device 300. The system may be implemented as software or a set of executable instructions. The instructions for performing any of the embodiments discussed herein of content presentation may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, instructions in accordance with the processes of FIGS. 1-2 and 7) may be stored in storage 308, and executed by control circuitry 304 of device 300.

Figure 3C:
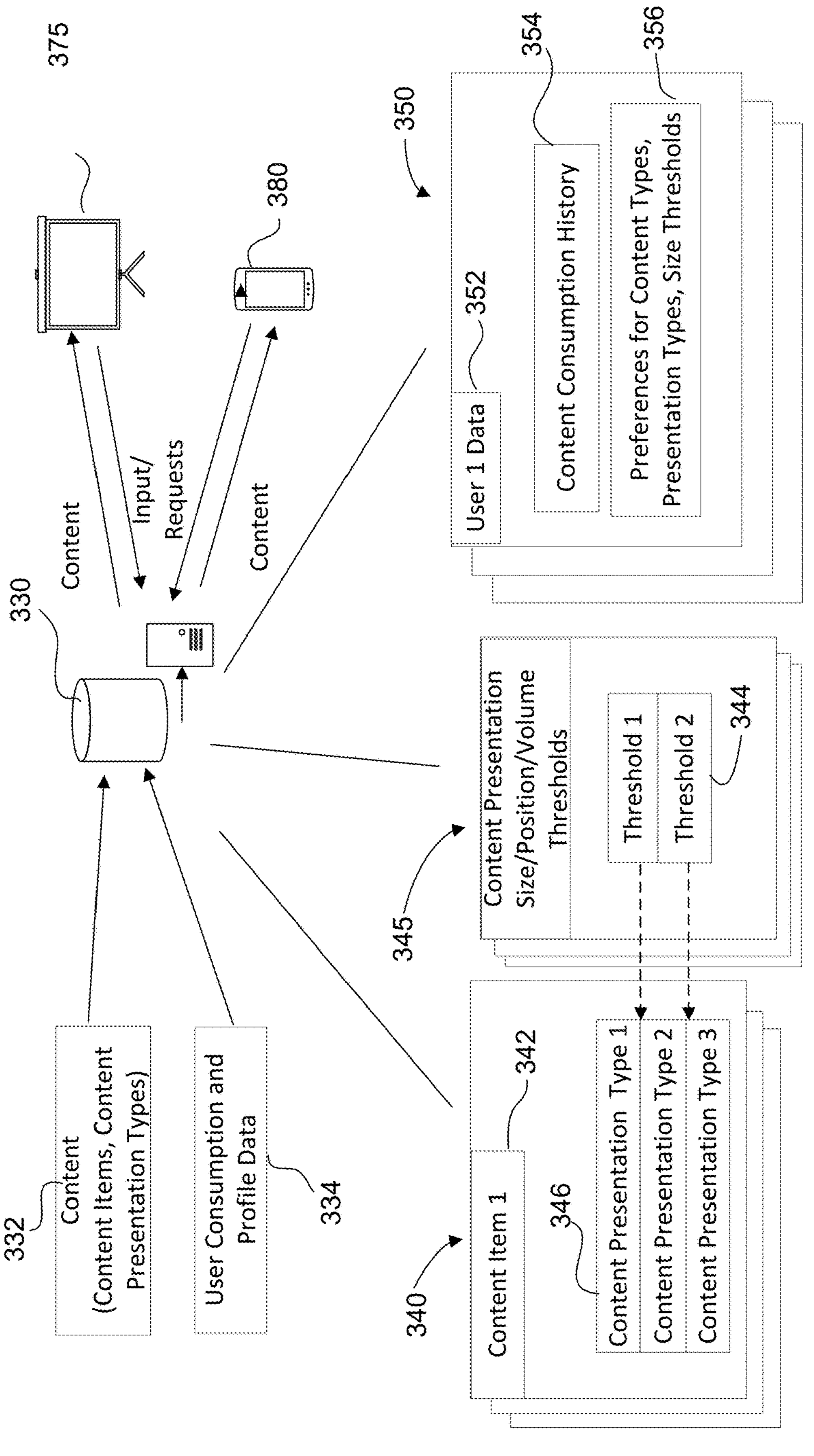
FIG. 3C shows an illustrative block diagram of a system for presenting content items simultaneously according to some embodiments of the disclosure.

FIG. 3C shows an illustrative block diagram of a system for presenting content items simultaneously according to some embodiments of the disclosure. A server and database system 330 is programmed and configured to manage and distribute content items for simultaneous presentation using selected content types of the content items. Content 332 received by the system may include streaming video such movies and live broadcast content, interactive video games, virtual reality content, social media content, web conferencing content, interactive informational or educational content, and other content. Server and database system 330 may include server (e.g., a media server) and storage elements (e.g., mass storage devices) for storing the content including particular content items in the form of content presentation types such as described herein.

Content items and their presentation types may be transmitted (e.g., across a computer network) to devices 375 and 380 for presentation using respective device displays (e.g., displays shown in FIGS. 4-9). Transmission of content, including particular presentation types, may be executed in response to requests/input received for presenting content and for modifying the presentation sizes or positions of presented content items such as described in embodiments herein.

Received content and related records used for presenting content are stored, in whole or in part, within database records including, for example, records 340 and 350. Records 340 include records of a particular content items 342 and associated records to respective content presentation types 346. The content items and respective content presentation types may be stored in mass storage devices, the particular locations to which the records may identify. Presentation size thresholds such as described herein are stored in records 345. The threshold records include threshold records 344 for presentation size, position, and/or volume thresholds associated with a content item.

When a request for a particular content item is received such as from a device 375 or 380, system 330 may perform a lookup in database records 340 that identify the requested item and its storage location. Included with a request may be an identification of a particular presentation type and/or the presentation size or position in which the requested content is to be presented. Based on a presentation size or position is identified, system 330 may determine/select a particular presentation type 346 to transmit to the requesting device. This determination/selection may be performed by comparing associated thresholds with the presentation size or positions such as further described herein.

Content consumption and profile data 334 is also received by system 330 and may be stored in a user account/profile record 352 to include historical records 354 or metadata pertaining to the consumption (e.g., downloading/presenting) of particular content items, content types, and presentation types. The data may include records or metadata pertaining to particular user accounts, devices, and/or profiles. For example, data or metadata may indicate preferences for particular presentation types of particular types of content. In some embodiments, system 330 determines and stores such preferences in records 356 based upon analyzing consumption data it receives in association with particular user profiles, accounts, or devices. In some embodiments, the data may be received in real time with requests received for content and/or content types from devices configured for presenting the content such as, for example, devices 375 and 380. Based on the consumption and profile data, threshold records and/or content presentation types may be generated/selected in accordance with the determined preferences.

Figure 4A:
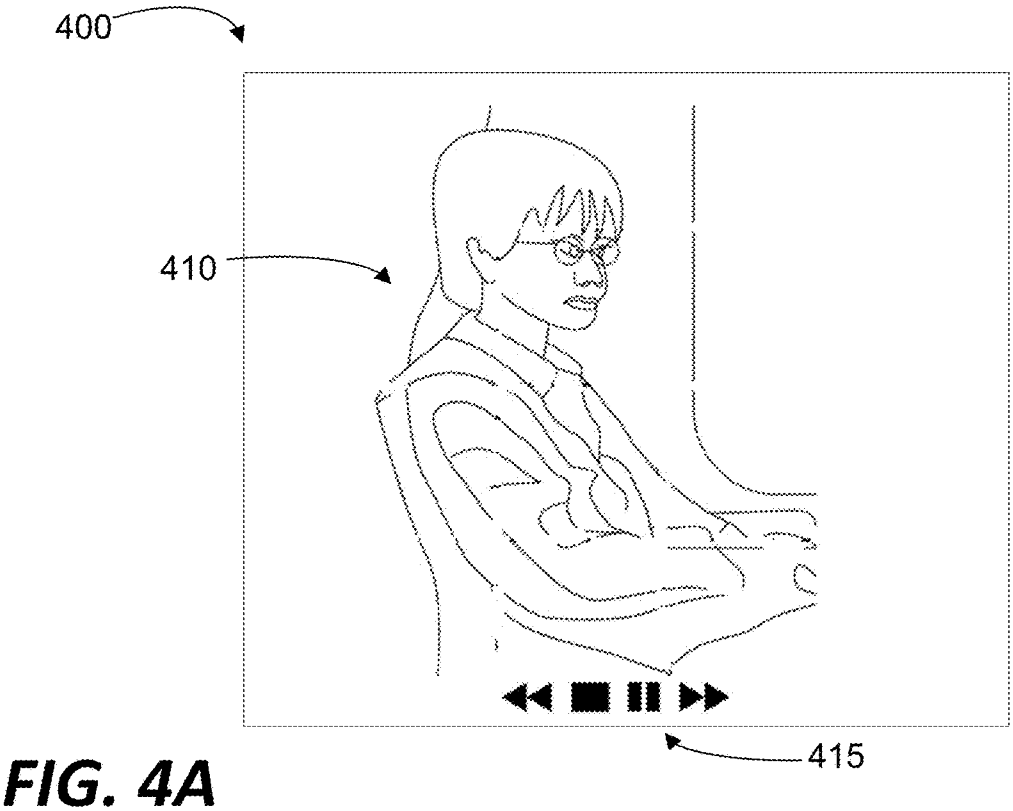
FIG. 4A is an illustrative diagram of a graphical computer interface for presenting content simultaneously according to some embodiments of the disclosure.

FIG. 4A is an illustrative diagram of a graphical computer interface for presenting content simultaneously according to some embodiments of the disclosure. An interface 400 illustrates a video presentation a first content item. Interface 400 includes graphical interface controls 415 that may be used to control the playback (e.g., stopping, pausing, forwarding, reversing) of the presented content.

Figure 4B:
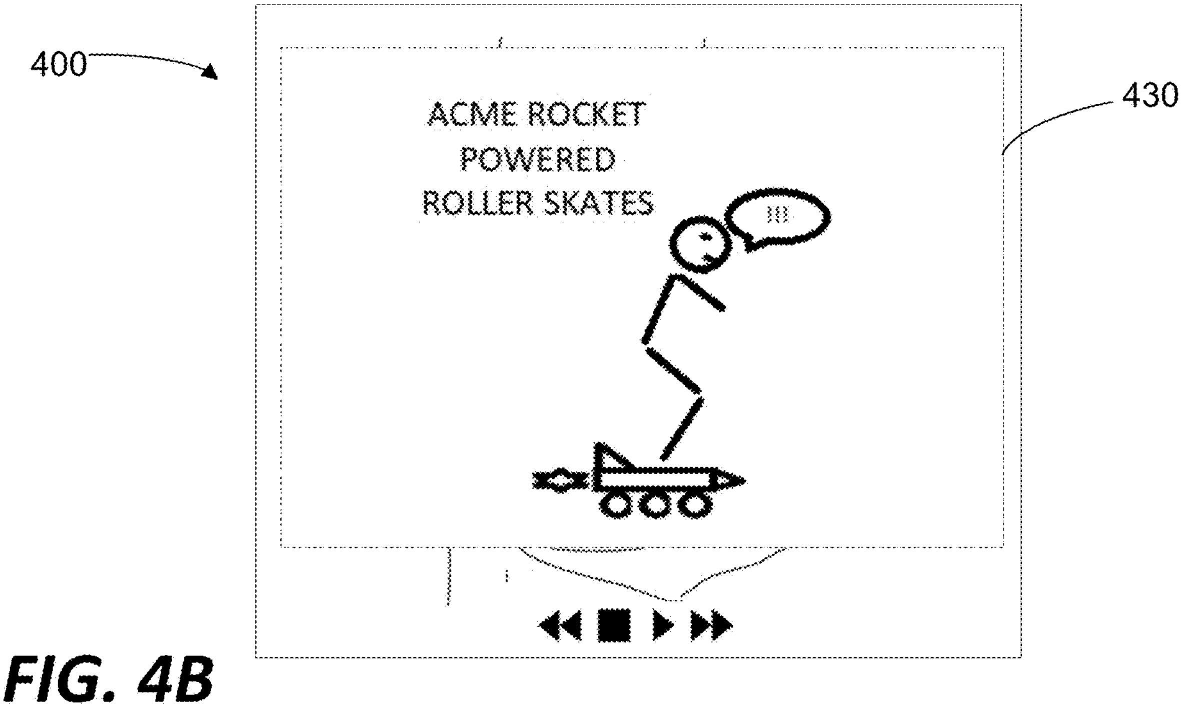
FIG. 4B is an illustrative diagram of a graphical computer interface for presenting content simultaneously according to some embodiments of the disclosure.

FIG. 4B is an illustrative diagram of the interface 400 of FIG. 4A presenting a second content item using a first presentation type 430 according to some embodiments of the disclosure. The first presentation type 430 includes a video presentation, the presentation representing the use of a product. At the time the second content item is presented, the presentation of the first content item may be initially paused. In some embodiments, the second content is presented prior to the start of a presentation of the second content item. In some embodiments, receiving input selecting the presentation of the second content item (e.g., a touchscreen or mouse click selection) causes a different or separate presentation to be generated (e.g., by hyperlinking in a web browser to a website associated with the presented content item).

FIG. 5A is an illustrative diagram of a graphical computer interface presenting content items simultaneously according to some embodiments of the disclosure. Interface 400 (of FIGS. 4A and 4B) is shown receiving input/requests for modifying the size of a presentation 530A of the second content item which was initially presented using a first presentation type 430 in FIG. 4B. The request to modify the presentation size of the second content item is received in the form of input to a touchscreen interface by a hand 515, which has dragged the edge of presentation 530A to a location 520 and resulted in an overall smaller presentation size than of the presentation type 430 shown in FIG. 4B.

While being reduced in size, it is determined that the presentation size of the second content item has crossed a programmed presentation size threshold such as further described herein. In response to crossing the threshold, the presentation type of the second content item has been changed from the video presentation type 430 to an image presentation type 530A. The image may include a static image of a product and text indicating the name of the product, which can more clearly present information about the product than a video presentation type within the reduced presentation size. In some embodiments, receiving input selecting the presentation of the second content item (e.g., a touchscreen or mouse click selection) causes a different presentation type and/or presentation size to be presented (e.g., the presentation type 430 of FIG. 4B).

Figure 5B:
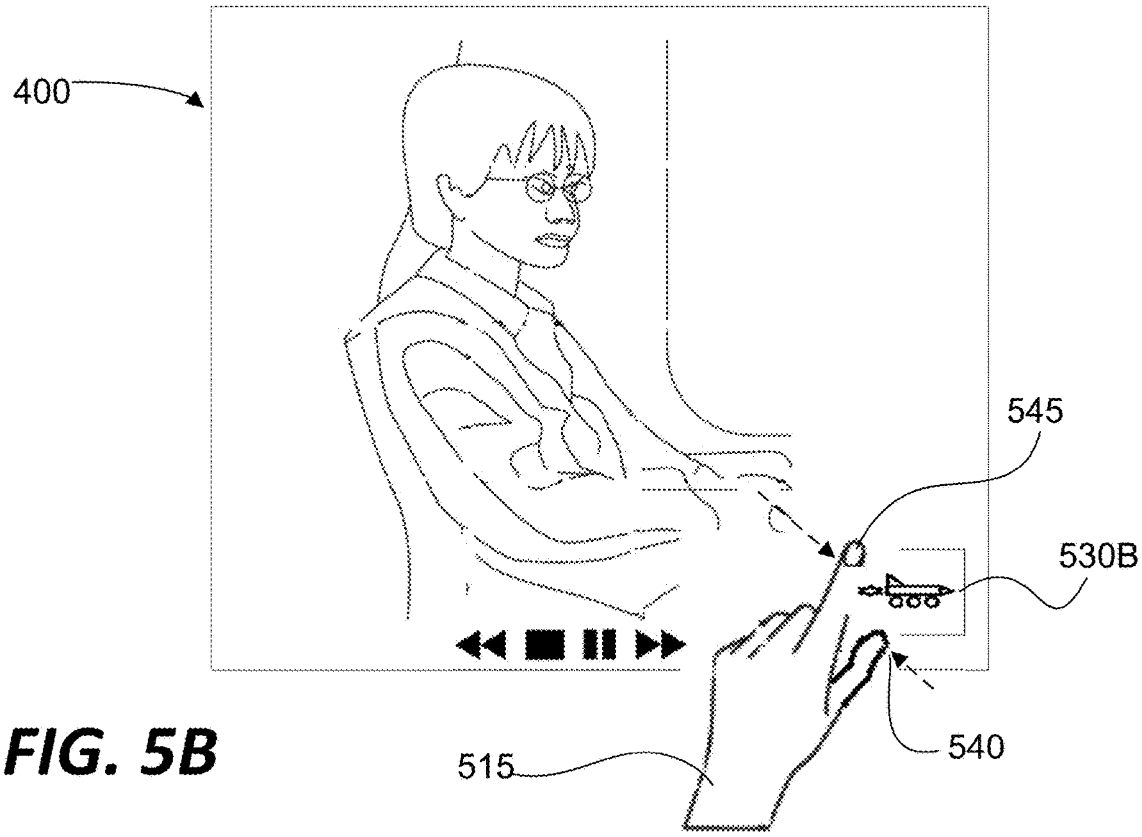
FIG. 5B is an illustrative diagram of a graphical computer interface presenting content items simultaneously according to some embodiments of the disclosure.

FIG. 5B is an illustrative diagram of a graphical computer interface presenting content items simultaneously according to some embodiments of the disclosure. Interface 400 (of FIGS. 4A, 4B, and 5A) is shown receiving input/requests for modifying the size of a presentation 530A of the second content item, which was initially presented using a first presentation type 430 in FIG. 4B and presented using a second presentation type 530A in FIG. 5A. The request to modify the presentation size of the second content item is received in the form of input to a touchscreen interface by a hand 515, which has dragged together the edges of presentation 530B to locations 540 and 545 and resulted in an overall smaller presentation size than of the presentation type 530A shown in FIG. 5B.

While being reduced in size, it is determined that the presentation size of the second content item has crossed another programmed presentation size threshold such as further described herein. In response to crossing this threshold, the presentation type of the second content item has been changed from an image presentation type 530A to an image icon presentation type 530B. The presentation may include a characteristic icon image of a product, which can more clearly identify the product than a video presentation type or a text presentation type within the reduced presentation size.

Figure 6A:
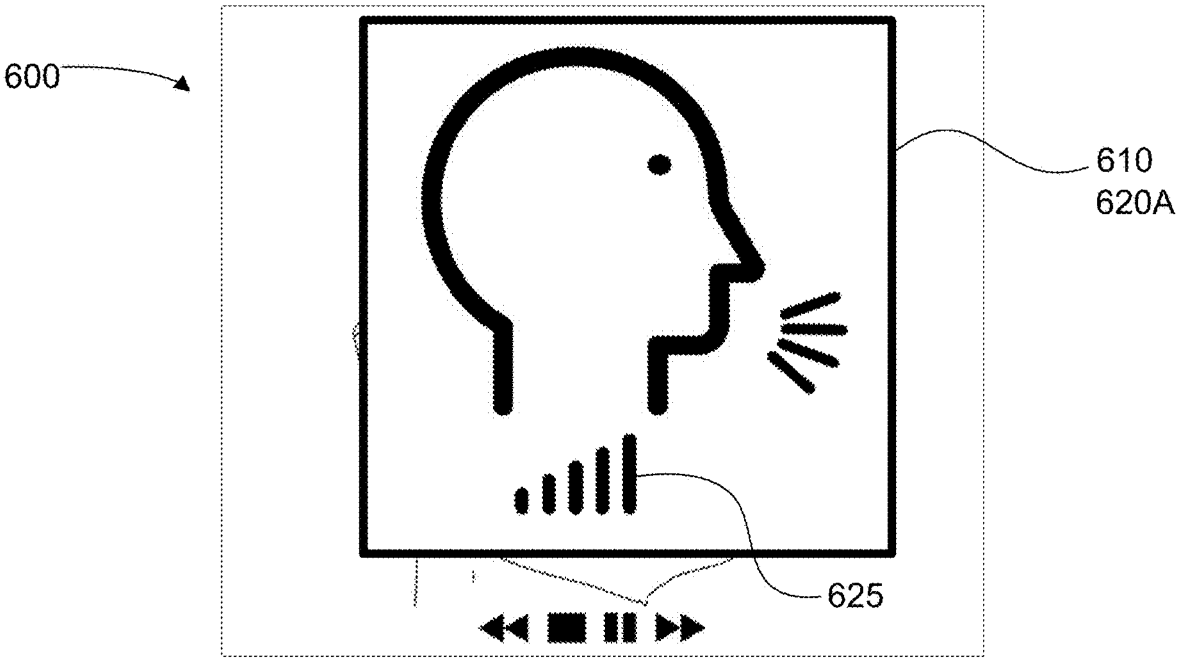
FIG. 6A is an illustrative diagram of a graphical computer interface for simultaneously presenting content with audio according to some embodiments of the disclosure.

FIG. 6A is an illustrative diagram of a graphical computer interface for simultaneously presenting content with audio according to some embodiments of the disclosure. A content item 610 using a content presentation type 620A with audio is presented through an interface 600 and a connected audio output (e.g., speakers). Presentation type 620A may represent video content, for example, that includes audio content. Interface 600 includes a graphical volume control selector 625 which is configured to receive input (e.g., through a touchscreen). In some embodiments, the content item 610 (e.g., an advertisement content) is presented using presentation type 620A in response to receiving a request to present a first content item 605 shown in FIG. 6B (e.g., a streaming video content item).

Figure 6B:
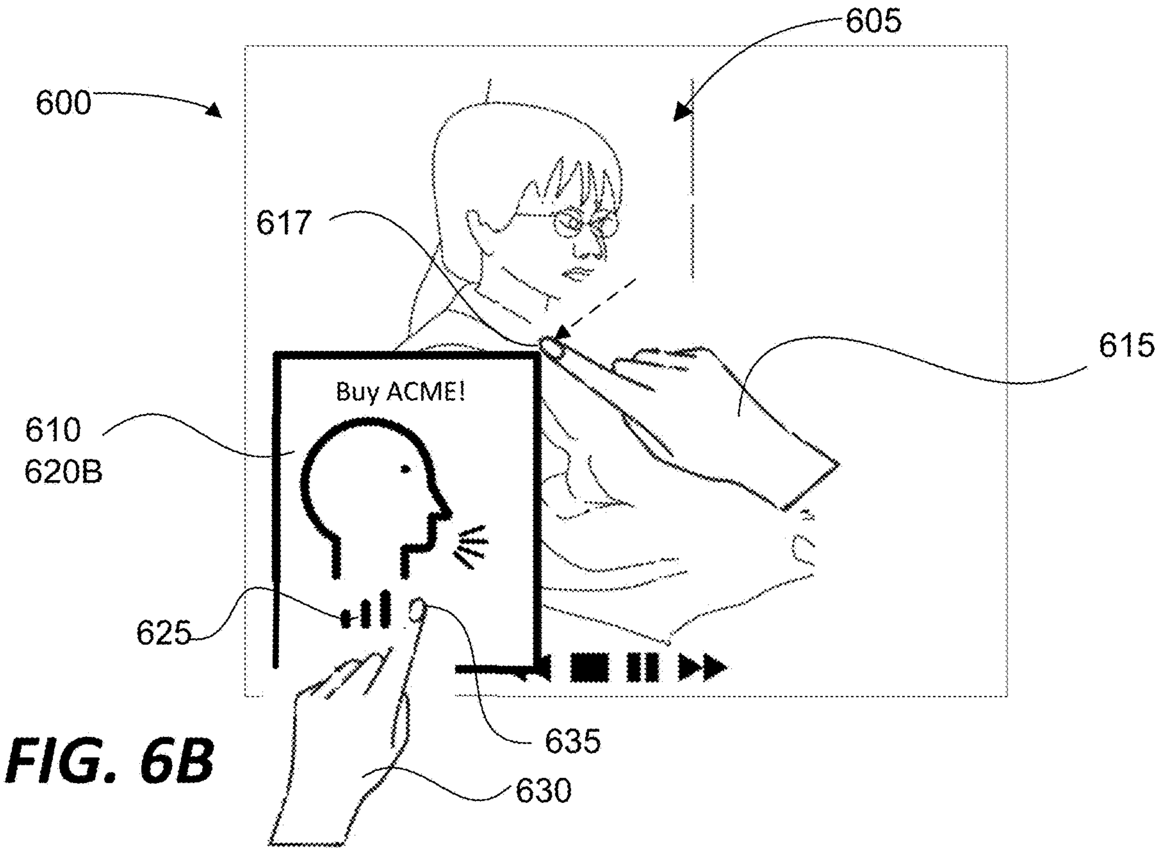
FIG. 6B is an illustrative diagram of a graphical computer interface presenting content items with audio simultaneously according to some embodiments of the disclosure.

FIG. 6B is an illustrative diagram of the graphical computer interface 600 of FIG. 6A presenting content items with audio simultaneously. Interface 600 is shown receiving input/requests for modifying the size of the presentation of content item 610. The request to modify the presentation size is received in the form of input to a touchscreen interface by a hand 615, which has dragged an edge of the presentation to a location 617 and caused an overall smaller presentation size than of the presentation of content item 610 shown in FIG. 6A. In response to modifying the presentation size of content item 610, content item 605 is presented simultaneously with content item 610.

Input/requests are received from a second hand 630 through volume control selector 625 at location 635 for reducing the volume of the presentation of content item 610. In response to reducing the presentation size and/or the presentation volume of content item 610, a process determines whether the modifications of the size or volume cause them to cross respective thresholds. In response to determining that modifying the volume causes it to cross a particular threshold, the presentation type of content item 610 is changed to a second presentation type 620B. Presentation type 620B includes a text rendering of spoken audio of content item 610. This way, audio content that may not be audible at the modified volume can be visually read using presentation type 620B.

In some embodiments, a content item presented in a reduced/modified presentation size or volume includes a competition or other event-type content item (e.g., a broadcast sporting event). In response to modifying the content item to a size or volume below a particular threshold, some presentation types may be used to provide key content of the competition or event without interfering with a presentation of a different, simultaneously presented content item (e.g., a streaming video). For example, key content of a particular competition or event may include the score of a competition, the amount of time left in a competition, the current leader of a competition, etc. A presentation type may represent a limited presentation (e.g., updating or scrolling text) which is based on the modified size or volume of the presentation.

Figure 7:
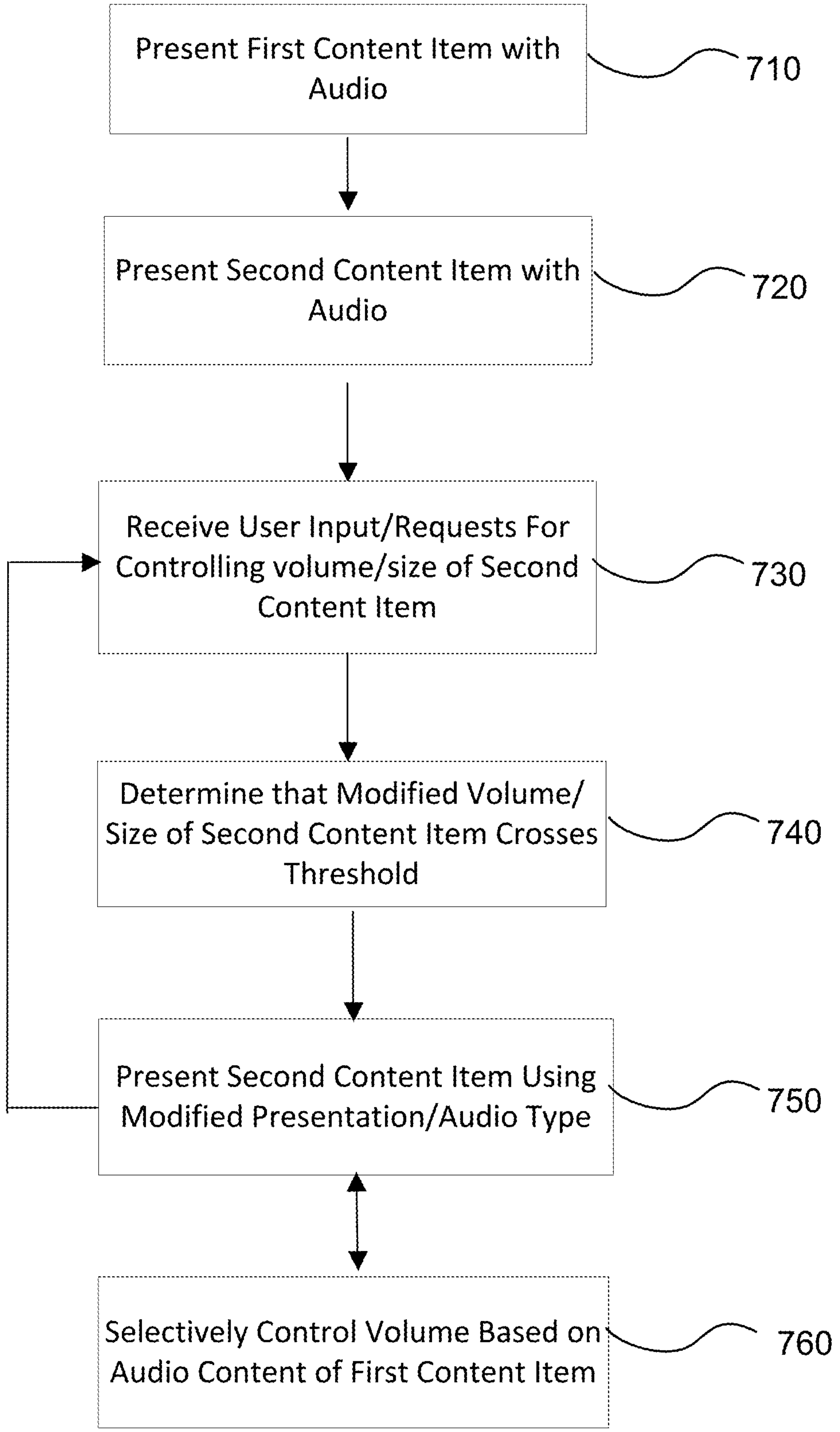
FIG. 7 is an illustrative flowchart of a process for simultaneous presentation of content using multiple audio presentation types according to some embodiments of the disclosure.

FIG. 7 is an illustrative flowchart of a process for simultaneous presentation of content using multiple audio presentation types according to some embodiments of the disclosure. At block 710, a first content item with audio (e.g., streaming video) is presented. At block 720, a second content item with audio (e.g., an advertisement) is presented. The second content item may be selected and/or presented in response to a request to present the first content item and may be presented before the first content item. For example, a particular advertisement may be selected and presented based on a particular streaming video that is requested, for example, using account information associated with the device or application through which the streaming video is presented. In some embodiments, the first content item is automatically paused (e.g., a playing of a streaming video is suspended).

At block 730, a request is received for modifying the presentation size or volume of the second content item. The request may be in the form of user input (e.g., utilizing a mouse or touchscreen) in association with a computer interface such as illustrated in FIGS. 6A and 6B. At block 740, the process determines the modified volume of the second content item's presentation following the request at block 730. The determined presentation volume is compared to a threshold and the process determines when the presentation volume of the second content item has crossed the threshold (e.g., from above the threshold to being below the threshold).

At block 750, in response to determining that the threshold has been crossed, the second content item is presented using a modified audio presentation type. Such as further described herein, the modified audio presentation type is optimized for presentation using the modified (e.g., reduced) presentation volume. In some embodiments, at block 760, the presentation type of the second content item is adapted to dynamically and selectively control the presentation volume based on the audio content of the first content item. For example, during portions of spoken content of the first content item, the volume and/or audio portion of the second content item may be reduced, paused, or eliminated. In some embodiments, the audio content of the second content item may be presented using a visual text display during selected audio portions of the first content item. While the presentation of the second item proceeds, further requests for modifying its presentation volume may be received at block 730.

Figure 8A:
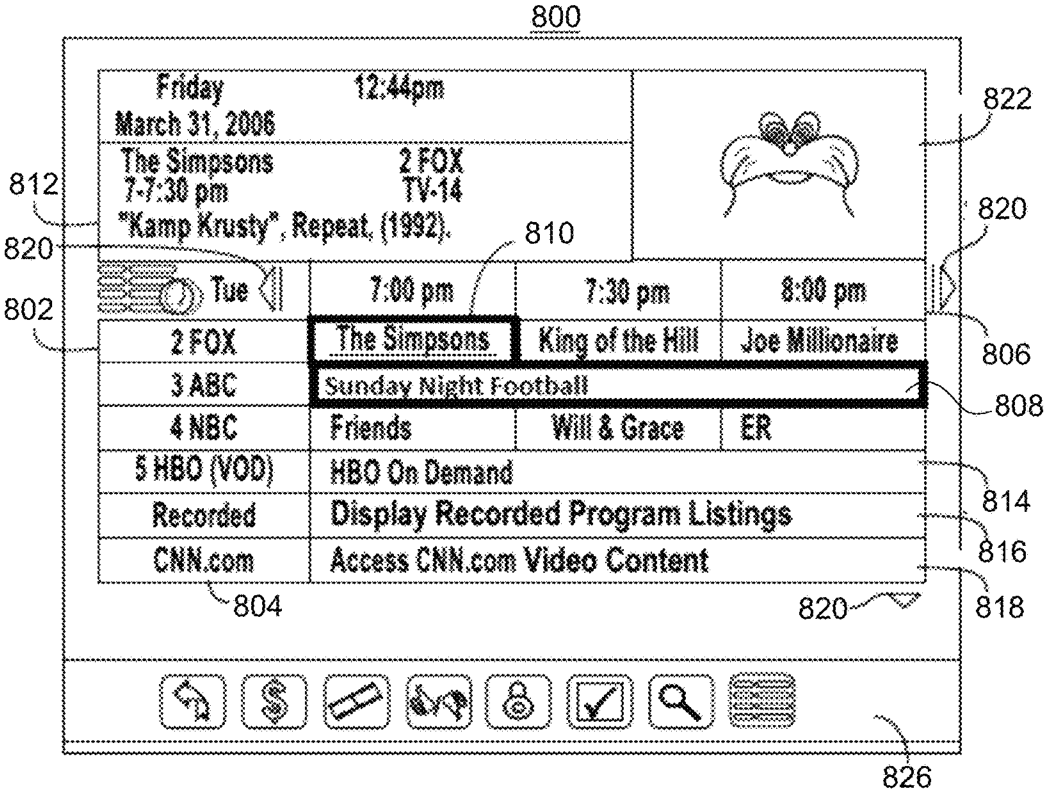
FIG. 8A shows illustrative grid of a program listings display arranged by time and source that also enables access to different content and presentation types in a single display.
Figure 8B:
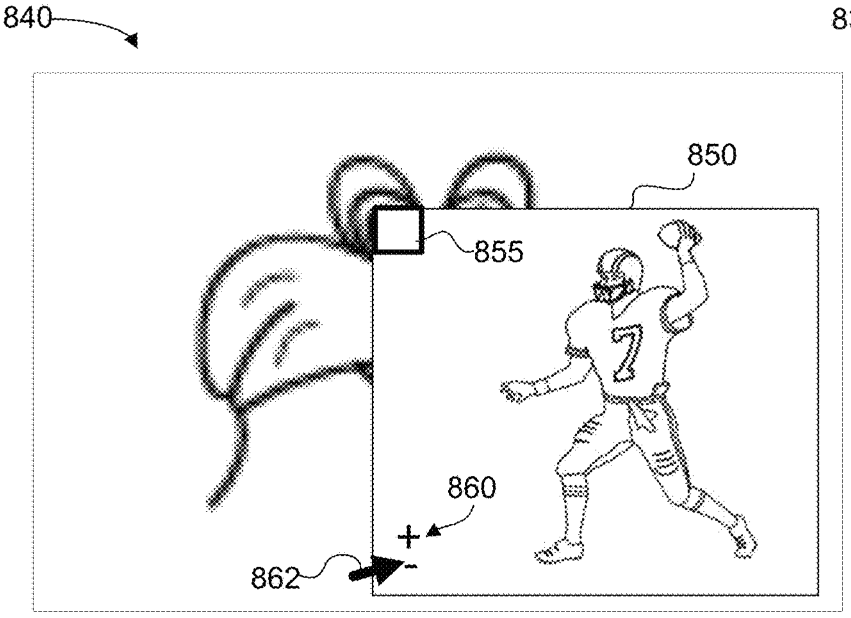
FIG. 8B is an illustrative diagram of a graphical computer interface for presenting content simultaneously according to some embodiments of the disclosure.

FIG. 8A shows illustrative grid of a program listings display 800 arranged by time and source that also enables access to different content and presentation types in a single display. Display 800 may include grid 802 with: (1) a column of source/content type identifiers 804, where each source/content type identifier (which is a cell in the column) identifies a different source or content type available; and (2) a row of broadcast time identifiers 806, where each time identifier (which is a cell in the row) identifies a time block of programming. Grid 802 also includes cells of program listings, such as program listings 808 and 810, where each listing provides the title of the program provided on the listing's associated channel and time. With a user input device (e.g., remote control device 820, a touchscreen, mouse, etc.), a user can select program listings such as by selecting and highlighting listing 810. Information relating to the program listing selected may be provided in program information region 812. Region 812 may include, for example, the program title, the program description, the time the program is provided (if applicable), the channel the program is on (if applicable), the program's rating, and other desired information. A second program listing 808 may be selected and highlighted for simultaneous presentation with a first selection 810 such as shown in FIG. 8B.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., third party broadcast/on-demand sources). Internet content may include web events, such as a chat session or Webcast, or content available on-demand as streaming content or downloadable content through an Internet web site or other Internet access (e.g. FTP).

Grid 802 may provide media guidance data for non-linear programming including on-demand listing 814, recorded content listing 816, and Internet content listing 818. A display combining media guidance data for content from different types of content sources is sometimes referred to as a "mixed-media" display. Various permutations of the types of media guidance data that may be displayed that are different than display 800 may be based on user selection or guidance application definition (e.g., a display of only recorded and broadcast listings, only on-demand and broadcast listings, etc.). As illustrated, listings 814, 816, and 818 are shown as spanning the entire time block displayed in grid 802 to indicate that selection of these listings may provide access to a display dedicated to on-demand listings, recorded listings, or Internet listings, respectively. In some embodiments, listings for these content types may be included directly in grid 802. Additional media guidance data may be displayed in response to the user selecting one of the navigational icons 820. (Pressing an arrow key on a user input device may affect the display in a similar manner as selecting navigational icons 820.)

Display 800 may also include a content display region 822, and options region 826. Display region 822 may allow the user to view and/or preview programs that are currently available, will be available, or were available to the user. The content of video region 822 may correspond to, or be independent from, one of the listings displayed in grid 802. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 826 may allow the user to access different types of content, media guidance application displays, and/or media guidance application features. Options region 826 may be part of display 800 (and other display screens described herein), or may be invoked by a user by selecting an on-screen option or pressing a dedicated or assignable button on a user input device. The selectable options within options region 826 may concern features related to program listings in grid 802 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

Options region 826 may include access to an interface for selecting/programming content presentation types and thresholds such as described herein. For example, programmable settings may permit designation of particular presentation types (e.g., streaming video, image, audio, closed captioning) to be used based on the thresholds (e.g., using a text content type when the presentation size is below or between particular thresholds). The settings may be further configured with respect to content type (e.g., movies, advertisements, sports broadcasts). The settings/records may be stored, for example, within records of system 330 of FIG. 3C and utilized when presenting content items simultaneously such as described herein.

Figure 8C:
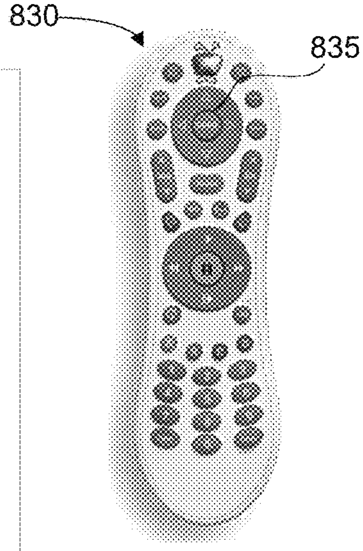
FIG. 8C is an illustrative diagram of a remote control device for navigating the interfaces of FIGS. 8A and 8B.

FIG. 8B is an illustrative diagram of a graphical computer interface for presenting content simultaneously according to some embodiments of the disclosure. FIG. 8C is an illustrative diagram of a remote control device 830 for navigating the interfaces of FIGS. 8A and 8B. A display 840 includes a primary presentation 845 of a content item selected from display 800 at 810. A second presentation 850, selected from display 800 at 808, is simultaneously presented overlapping presentation 845 using a smaller display size than presentation 850. Display 800 may provide an interface for selecting which of presentations 845 and 850 is presented as a primary (e.g., larger sized) presentation and a smaller sized (e.g., PIP) presentation. The second presentation 850 provides an interface with controls 855 and 860 for modifying the presentation position and size, respectively, of presentation 850. Remote control 830 may utilize navigation buttons 835, for example, to select content items at 810 and 815 for presentations 845 and 850, respectively, and to select/activate controls 855 and 860 utilizing a cursor 862 to control the size, positions, and/or volumes of presentation 850.

Figure 8D:
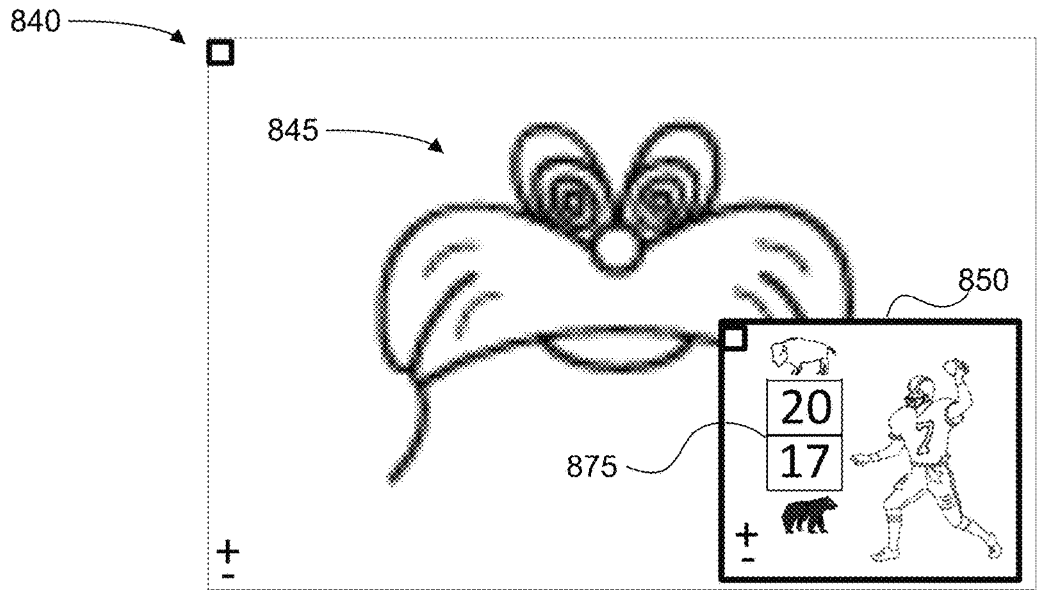
FIG. 8D is an illustrative diagram of the graphical computer interface of FIG. 8C after receiving input/requests to modify the size and position of simultaneously presented content in display 840.

FIG. 8D is an illustrative diagram of the graphical computer interface of FIG. 8C after receiving input/requests to modify the size and position of simultaneously presented content in display 840. The presentation size and position of presentation 850 has been modified such as by receiving requests/input from remote control 830 with guidance of an arrow pointer 880. In response to modifying the presentation size and/or position, the content type of presentation 850 has been changed from a streaming video presentation type to including a graphical/text overlay 875 of the status of the content of presentation 850. This way, less attention may be required for consuming presentation 850 and permitting greater attention to be directed to presentation 845. In some embodiments, the content type of presentation 850 is also changed in response to a modification of the audio volume of presentation 850.

The change in presentation type of presentation 850 is executed in response to modifying the presentation size, position, and/or volume across particular thresholds such as described herein. For example, a presentation size threshold may reflect that a reduction in size of presentation 850 below a certain proportion of the size of display 840 causes the presentation type of presentation 850 to change. A presentation position threshold may reflect that a modification of the position of presentation 850 outside of a particular portion of display 840 causes a change in presentation type. The change in presentation type includes a text and icon display at 875 reflecting the status of the presentation's content (e.g., competition score).

In some embodiments, the content of presentation 845 is analyzed to determine portions of the content that are of at least a particular significance level to the content's presentation. For example, portions of the content containing video, images, or audio of particular significant characters or of certain events within the content (e.g., of the main characters, of the ending) may be determined as significant. When presentation 850 is interfering beyond a particular threshold amount with the presentation of these significant portions, the presentation type of presentation 850 may be modified such as to cause less interference (e.g., modifying the audio type to a text display with little or no volume). When the presentation 850 would cease to interfere beyond the threshold using a more substantial presentation type, the presentation type may be changed to the more substantial (e.g., the original unmodified) presentation type.

Figure 8E:
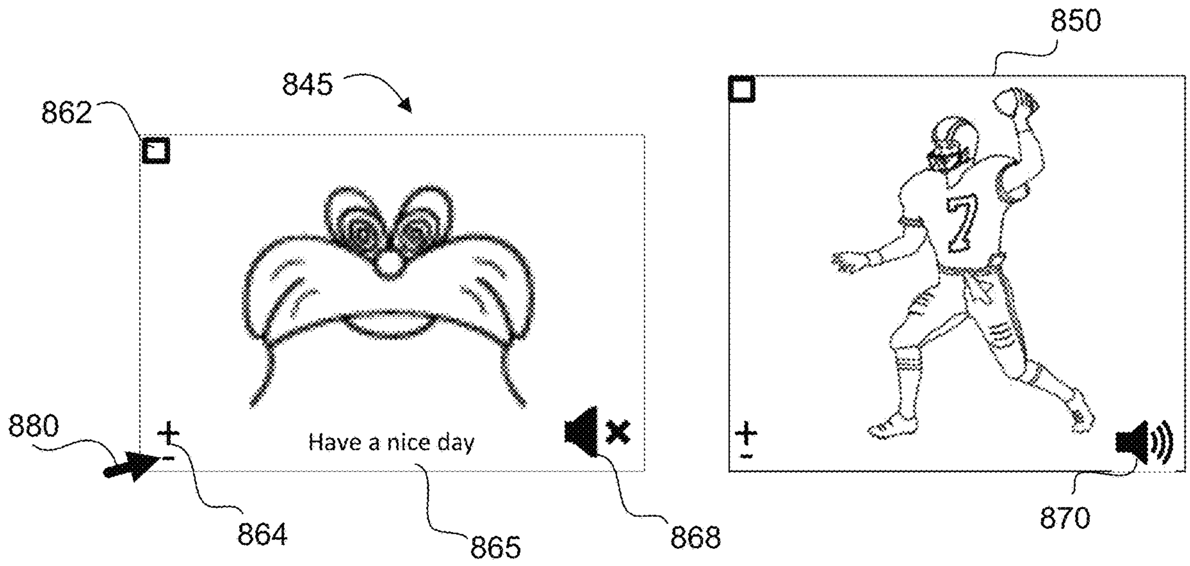
FIG. 8E is an illustrative diagram of a graphical computer interface of for simultaneously presenting content using preferential presentation types.

FIG. 8E is an illustrative diagram of a graphical computer interface of for simultaneously presenting content using preferential presentation types. In some embodiments, simultaneous presentations 845 and 850 are each modified in size, position, and/or volume. For example, presentation 845 may be reduced in size using a sizing control at 864 while presentation 850 is increased in size beyond the size of presentation 845. A preference for one presentation over another (e.g., presentation 850 over presentation 845) may be determined based on analyzing the increase in relative size or other modifications. Based on determining a preference, a modified presentation type may be applied to reduce the interference of the presentation of a relatively less preferred content item. For example, the audio content of presentation 845 is muted (e.g., as indicated by indicator 868), a text presentation type of the audio content at 865 is presented, and the audio content of presentation 850 is presented is fully engaged (e.g., as indicated by indicator 870).

In some embodiments, modifications of a presentation during particular portions of content are analyzed to determine a preference for particular portions of content items (e.g., portions of a football game in which the play enters a "red zone"). Based on the analysis, particular presentation types selected to emphasize/enhance the presentation of the content item may be applied automatically during those preferred portions that are identified. Identifying preferred portions may be performed, for example, by using data or metadata obtained in connection with the content (e.g., extracting data from a website publishing the current/real-time status of the content).

In some embodiments, user account/profile preferences for particular presentation types are determined based on the modifications of one or more presentations and of presentation types selected in connection with those modifications. For example, a request to mute one presentation after being reduced in size to less than the size of another simultaneous presentation is analyzed to determine that the muted presentation type is preferred when future size modifications are requested. For example, the volume of presentation 845 may be automatically muted in the future when a request is received to reduce its size below a particular relative size of presentation 850.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for presenting content items simultaneously, the method comprising:

receiving a first request to present a first content item with a first audio on a display;

in response to receiving the first request, causing to be presented a second content item with a second audio on the display, wherein the first content item with the first audio and the second content item with the second audio are presented simultaneously on the display;

receiving a second request to reduce a volume level of the second content item;

determining that reducing the volume level of the second content item causes the volume level to fall below a volume threshold; and in response to determining that reducing the volume level of the second content item causes the volume level to fall below the volume threshold, generating for display a visual text corresponding to the second audio as an overlay on the display.

2. The method of claim 1, wherein the volume threshold is a non-zero value.

3. The method of claim 1, wherein the visual text is a textual description of the second content item, and wherein the visual text is generated based at least in part on metadata corresponding to the second content item.

4. The method of claim 1, wherein generating for display the visual text corresponding to the second audio as the overlay further comprises modifying a presentation size of the second content item.

5. The method of claim 1, wherein generating for display the visual text corresponding to the second audio as the overlay on the display further comprises:

generating the visual text corresponding to the second audio as a scrolling text wherein the scrolling text corresponds to the visual text corresponding to the second audio.

6. The method of claim 1, wherein the second content item is presented on the display in a first presentation type, the method further comprising:

receiving a third request to modify a presentation position of the second content item on the display;

determining that modifying the presentation position of the second content item on the display causes the presentation position to cross a presentation position threshold; and in response to determining that modifying the presentation position causes the presentation position to cross the presentation position threshold, causing to be simultaneously presented on the display the first content item and the second content item, wherein the second content item is presented on the display in a second presentation type, wherein the second presentation type is different from the first presentation type.

7. The method of claim 6, wherein the presentation position threshold comprises a threshold distance on the display, and wherein determining that modifying the presentation position of the second content item on the display causes the presentation position to cross the presentation position threshold comprises determining that the third request to modify the presentation position of the second content item on the display is a request to move the second content item on the display by a distance greater than the threshold distance.

8. The method of claim 6, wherein the second presentation type comprises at least one presentation element and wherein the at least one presentation element is one of video, image, text, or audio.

9. The method of claim 6, wherein the presentation position threshold comprises a threshold amount of overlap between the second content item and the first content item on the display, wherein determining that modifying the presentation position of the second content item on the display causes the presentation position of the second content item to cross the presentation position threshold comprises determining that the third request to modify the presentation position of the second content item on the display is a request to move the second content item on the display to increase an amount of overlap to greater than the threshold amount of overlap, and wherein the method further comprises, based at least in part on determining that the third request is a request to move the second content item on the display to increase the amount of overlap to greater than the threshold amount of overlap, modifying the second presentation type of the second content item.

10. The method of claim 1, further comprising:

in response to determining that reducing the volume level of the second content item causes the volume level to fall below the volume threshold, eliminating the second audio during presentation of the second content item.

11. A system for presenting content items simultaneously, the system comprising:

control circuitry configured to:

receive a first request to present a first content item with a first audio on a display;

in response to receiving the first request, cause to be presented a second content item with a second audio on the display, wherein the first content item with the first audio and the second content item with the second audio are presented simultaneously on the display;

receive a second request to reduce a volume level of the second content item;

determine that reducing the volume level of the second content item causes the volume level to fall below a volume threshold; and in response to determining that reducing the volume level of the second content item causes the volume level to fall below the volume threshold, generate for display a visual text corresponding to the second audio as an overlay on the display.

12. The system of claim 11, wherein the volume threshold is a non-zero value.

13. The system of claim 11, the visual text is a textual description of the second content item, and wherein the visual text is generated based at least in part on metadata corresponding to the second content item.

14. The system of claim 11, wherein generating for display the visual text corresponding to the second audio as the overlay further comprises modifying a presentation of the second content item.

15. The system of claim 11, wherein the control circuitry, when generating for display the visual text corresponding to the second audio as the overlay on the display, is further configured to:

generate the visual text corresponding to the second audio as a scrolling text wherein the scrolling text corresponds to the visual text corresponding to the second audio.

16. The system of claim 11, wherein the second content item is presented on the display in a first presentation type, and wherein the control circuitry is further configured to receive a third request to modify a presentation position of the second content item on the display;

determine that modifying the presentation position of the second content item on the display causes the presentation position to cross a presentation position threshold; and in response to determining that modifying the presentation position causes the presentation position to cross the presentation position threshold, cause to be simultaneously presented on the display the first content item and the second content item, wherein the second content item is presented on the display in a second presentation type, wherein the second presentation type is different from the first presentation type.

17. The system of claim 16, wherein the presentation position threshold comprises a threshold distance on the display, and wherein determining that modifying the presentation position of the second content item on the display causes the presentation position to cross the presentation position threshold comprises determining that the third request to modify the presentation position of the second content item on the display is a request to move the second content item on the display by a distance greater than the threshold distance.

18. The system of claim 16, wherein the second presentation type comprises at least one presentation element and wherein the at least one presentation element is one of video, image, text, or audio.

19. The system of claim 16, wherein the presentation position threshold comprises a threshold amount of overlap between the second content item and the first content item on the display, wherein determining that modifying the presentation position of the second content item on the display causes the presentation position of the second content item to cross the presentation position threshold comprises determining that the third request to modify the presentation position of the second content item on the display is a request to move the second content item on the display to increase an amount of overlap to greater than the threshold amount of overlap, and wherein the method further comprises, based at least in part on determining that the third request is a request to move the second content item on the display to increase the amount of overlap to greater than the threshold amount of overlap, modifying the second presentation type of the second content item.

20. The system of claim 11, wherein the control circuitry is further configured to:

in response to determining that reducing the volume level of the second content item causes the volume level to fall below the volume threshold, eliminate the second audio during presentation of the second content item.

* * * * *